No. 681,634. Patented Aug. 27, 1901.
A. R. FORTIER
MOTOR STOP AND MOTION INDICATOR.
(Application filed Jan. 14, 1901.)
(No Model.)
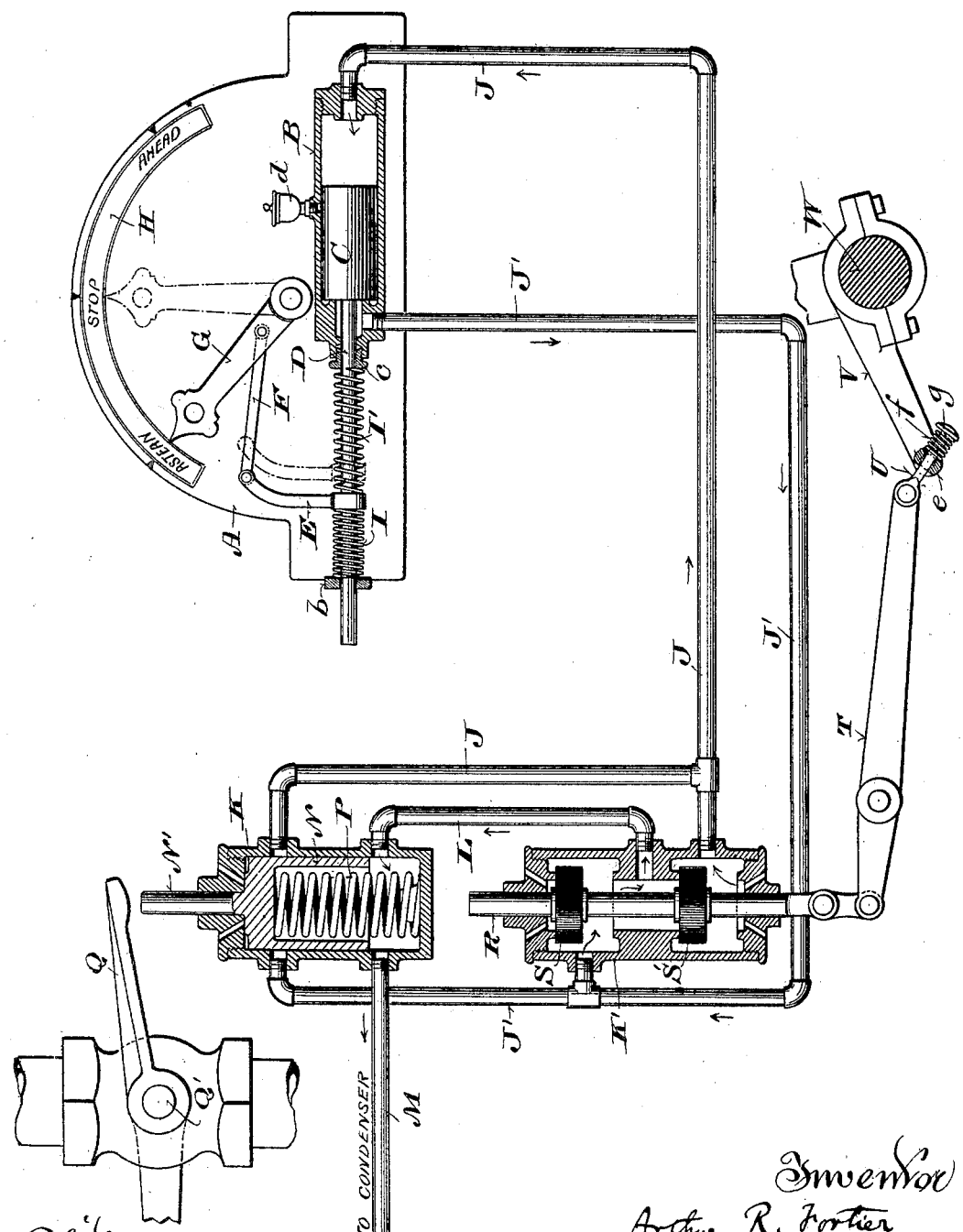
Witnesses:
Geo. W. Young.
N. E. Oliphant.
Inventor
Arthur R. Fortier
By H. G. Underwood
Attorneys

United States Patent Office.

ARTHUR R. FORTIER, OF WAUWATOSA, WISCONSIN.

MOTOR STOP AND MOTION INDICATOR.

SPECIFICATION forming part of Letters Patent No. 681,634, dated August 27, 1901.

Application filed January 14, 1901. Serial No. 43,140. (No model.)

*To all whom it may concern:*

Be it known that I, ARTHUR R. FORTIER, a citizen of the United States, and a resident of Wauwatosa, in the county of Milwaukee and State of Wisconsin, have invented certain new and useful Improvements in Motor Stop and Motion Indicators; and I do hereby declare that the following is a full, clear, and exact description thereof.

My invention has for its object to provide for automatic indication at a distance from a motor whether or not the same is active, and if so in what direction, said invention being especially designed for use on a marine vessel to indicate in the pilot-house thereof the direction of motion on the part of a propelling-engine or the fact that said engine has been stopped. In view of the foregoing my invention consists in what is hereinafter particularly set forth with reference to the accompanying drawing and subsequently claimed.

The drawing is a diagram illustrating means in accordance with my invention for automatic indication in the pilot-house of a marine vessel whether a steam propelling-engine is stopped or running for ahead or astern.

Referring by letter to the drawing, A indicates a support for a cylinder B, containing a piston C, having a rod D in connection therewith, this rod being guided in a cylinder-head and a bracket $b$, extending laterally from the support. Fast on the piston-rod is an arm E, connected by a link F with a pointer G in pivotal connection with the support A to swing in the arc of a circle, preferably arbitrarily marked by words or otherwise to designate direction of motion or stop of a distant motor according to the position of said pointer, such marking being herein shown on a segmental plate H, fast to said support back of the pointer. Spiral springs I I' are arranged on the piston-rod in opposite directions from the arm E, one of these springs being compressible against bracket $b$ aforesaid and the other against a gland $c$ of the stuffing-box end of the aforesaid cylinder. An oil-cup $d$ is shown in connection with the cylinder midway of its length, and by means of piping J J' the ends of said cylinder are connected with casings K K', containing valves hereinafter more particularly described. A pipe L couples the valve-casings, and a pipe M leads from casing K' to a condenser or vacuum-chamber. The valve N in chamber K is an inverted cup engaged by a spiral spring P under compression in said chamber, and the stem N' of this valve is shown in opposition to an arm Q, that is illustrated rigid on the stem Q' of a steam-engine throttle-valve; but said arm may be made to operate with the start and stop mechanism of any type of motor. The arm Q operates to push the valve N against resistance of spring P when the motor is stopped, and conversely said spring operates to move said valve in an opposite direction when said motor is started. When operated upon by spring P, the valve N is caused to close air-ports in one end of casing K as well as to cut off the piping J J' from said casing; but the reverse movement of said valve results in the opening of said ports and piping, the pipes L M, previously open to the aforesaid casing, being then cut off. Both ends of casing K' are provided with air-ports, these ports and those of like kind pertaining to casing K being preferably made in removable heads of said casings. Casing K' has a central reduction of bore between its unions with the piping J J', this reduction of bore being in communication with pipe L, and a reciprocative stem R is provided with valves S S', that control the passage of air or other fluid through said casing. The valve-stem R is coupled to one end of a lever T, and a rod U in pivotal connection with the other end of the lever extends through an eye in a lug $e$ of a crank V in connection with a reverse-shaft W, constituting part of the engine aforesaid, a spiral spring $f$ on the rod being interposed under pressure between said lug and a head $g$ of said rod. By means of the rod and spring the connection between lever T and crank V will automatically lengthen or shorten, as occasion may require, whereby proper seating of either valve S S' is insured.

From the foregoing it will be readily understood that valves S S' are automatically set to close air-ports in one end of the casing K' simultaneously with opening of like ports in the other end of said casing, and at the same time one terminal of the bore reduction in the aforesaid casing is opened and the other closed. As a result of this set of the valves S S' and opening of the throttle-valve aforesaid air is exhausted from one end of cylinder B and admitted at the other end of said cylinder, whereby the pointer G is automatically swung to a position that indicates direction of motion on the part of the engine of which said throttle-valve constitutes a part, one of the springs I I' being then contracted and the other expanded. Now if the throttle-valve be closed both ends of the cylinder B will be open to air, and owing to spring-pressure automatically exerted on piston C this piston will be moved to the center of said cylinder, whereby the aforesaid pointer is swung in position to indicate "Stop," this position of the pointer being shown by dotted lines.

I have shown and particularly described my invention as an adjunct to a steam-engine, especial reference being had to the utilization of said invention for indicating in the pilot-house of a marine vessel when the propelling-engine is stopped or running for either ahead or astern; but, as heretofore intimated, said invention is applicable in conjunction with any type of motor and may be varied in detail to permit the utilization of fluid-pressure as the means for actuating the piston to swing the pointer by which the stop or direction of motion on the part of a motor is indicated. Hence I do not wish to be understood as confining myself to what is herein specifically set forth. It is also to be understood that my invention is just as applicable in conjunction with a one-way motor as with a reversible motor.

Having thus described my invention, what I claim as new, and desire to secure by Letters Patent, is—

1. A cylinder, a piston in the cylinder, an arm fast on a rod connected to the piston, a spiral spring compressible and expansible on the rod incidental to movement of the arm, a pivotal pointer linked to said arm, and means in conjunction with the start and stop mechanism of a motor for exhausting fluid from either end of said cylinder simultaneously with its admission to the other end of same.

2. A cylinder, a piston in the cylinder, an arm fast on a rod connected to the piston, spiral springs compressible on the rod in opposite directions from the arm, a pivotal pointer linked to said arm, means in conjunction with the start and stop mechanism of a motor for exhausting fluid from either end of said cylinder simultaneously with its admission to the other end of same, and other means in conjunction with a reverse-shaft of the motor for shifting direction of flow on the part of said fluid with respect to the aforesaid cylinder.

3. A cylinder, a piston in the cylinder, an arm fast on a rod connected to the piston, spiral springs compressible on the rod in opposite directions from the arm, a pivotal pointer linked to said arm, a plurality of casings in pipe connection with each other and both ends of said cylinder, one of the casings being organized for admission of air at but one end of same and the other casing made with air-inlets at both ends, a vacuum-chamber pipe in connection with the first of said casings, a valve arranged in said first casing to control the inlets and outlets of same, this valve being provided with an exposed stem, a spring under compression against the valve, an arm in conjunction with start and stop mechanism of a motor operative in one direction against said stem to actuate said valve against spring resistance, a stem in the second of said casings, means whereby the latter stem is put into reciprocative connection with reverse mechanism of the motor, and a pair of valves on the latter stem controlling the inlets and outlets of said second casing, whereby the direction of flow on the part of air with reference to the aforesaid cylinder is made to accord with direction of motion on the part of said motor.

In testimony that I claim the foregoing I have hereunto set my hand, at Milwaukee, in the county of Milwaukee and State of Wisconsin, in the presence of two witnesses.

A. R. FORTIER.

Witnesses:
H. E. OLIPHANT,
B. C. ROLOFF.